3,753,894
WATER INJECTION BETWEEN CATALYST BEDS IN HYDRODESULFURIZATION OF RESIDUUM FEED
John D. Shoemaker and Kenneth L. Riley, Baton Rouge, La., assignors to Esso Research and Engineering Company
Continuation-in-part of application Ser. No. 119,222, Feb. 26, 1971, now Patent No. 3,720,602, dated Mar. 13, 1973. This application Nov. 17, 1971, Ser. No. 199,454
Int. Cl. C10g 23/02
U.S. Cl. 208—216            4 Claims

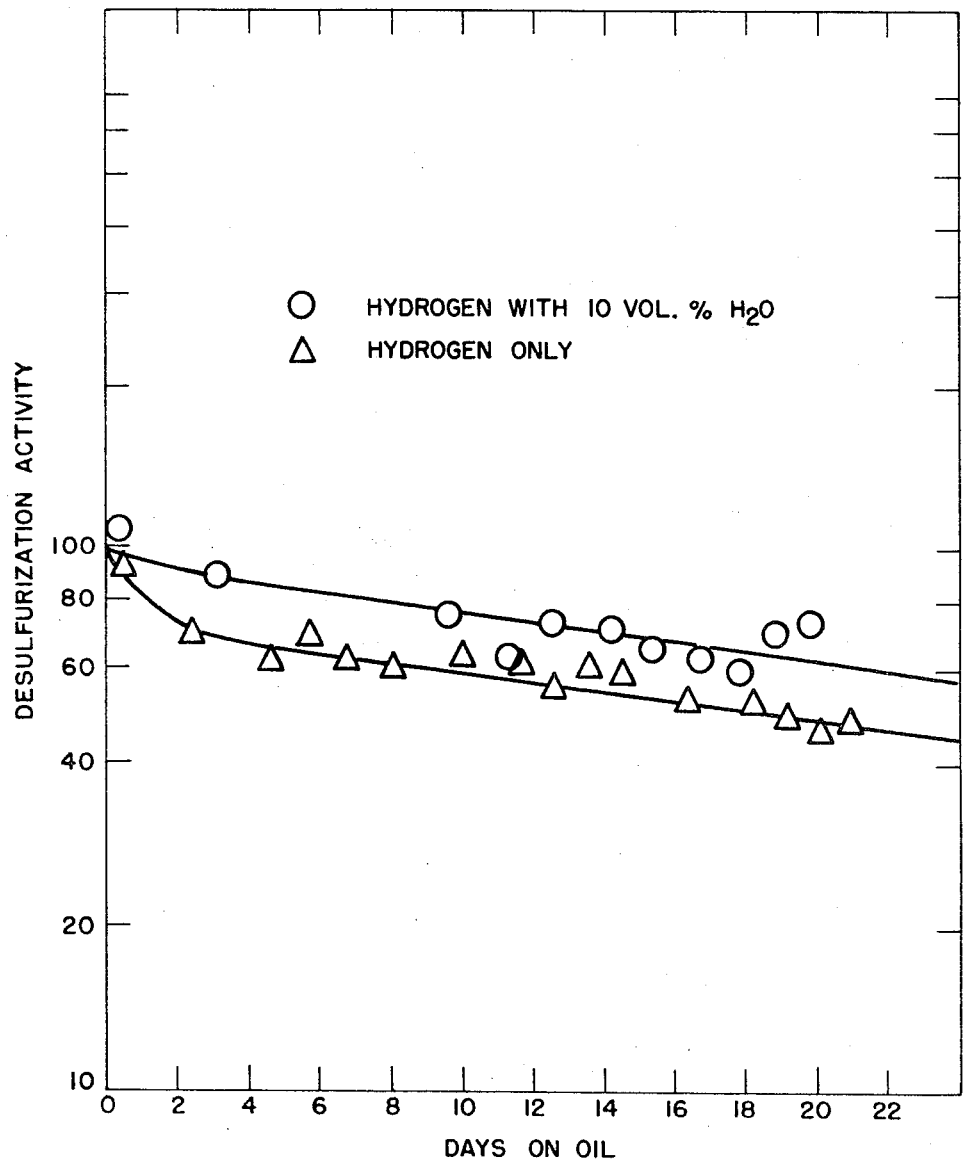

ABSTRACT OF THE DISCLOSURE

A hydrodesulfurization process for processing a sulfur-containing petroleum residuum feed wherein water is injected between the several catalyst beds of a multi-bed reactor to quench the products of the reaction and simultaneously to suppress deactivation of the catalyst, particularly as occurs during the initial period of a production run. The water can be added in concentration ranging up to about 50 percent, but preferably is added in concentration ranging up to about 20 percent, based on the volume of gases in the reactor, because above about the 20 percent level, the effects of hydrogen dilution offset any improvements obtained in suppression of catalyst deactivation. The catalysts comprise a metal or compounds of the metal, or metals, of Group VIB and/or Group VIII of the Periodic Table of the Elements, particularly those characterized as having a surface area of at least 100 m.$^2$/g., and preferably a surface area ranging from about 100 m.$^2$/g. to about 500 m.$^2$/g., the surface area being measured in pores having pore diameters of 30 to 80 A. and a minimum of surface area or pore volume measured in pores having a diameter greater than 100 A. It is found that water addition has no significant adverse effect on hydrogen consumption, catalyst strength, or product properties.

---

This is a continuation-in-part of U.S. application Ser. No. 119,222 filed Feb. 26, 1971, which issued as U.S. Pat. 3,720,602 on Mar. 13, 1973.

The art is replete with references describing hydrofining, particularly hydrodesulfurization processes wherein hydrocarbon oil fractions, including light, middle and residual distillate fractions or even whole crudes are treated with hydrogen under a wide range of elevated hydrogen pressures and temperatures in the presence of catalyst composites containing a metal or compounds of a metal, or metals, of Group VI and/or Group VIII, of the Periodic Table of the Elements (Fisher Scientific Company, printed in the U.S.A., copyright 1953). In such reactions the carbon-sulfur bonds of the molecules constituting the feed are broken and sulfur-containing moieties react with hydrogen to produce hydrogen sulfide. The resulting hydrocarbon stream, reduced in its sulfur content, is separated from the residual mixture of hydrogen and hydrogen sulfide gases.

Processes for hydrodesulfurizing petroleum residua, however, are exceedingly more difficult to operate than those which treat the lighter feed stocks. This is because petroleum residua, and even petroleum crude, contains (1) asphaltenes and other high molecular weight, aromatic structures which severely inhibit the rate of hydrodesulfurization and cause catalyst deactivation, (2) ash-forming constituents, such as metallo-organic compounds, which result in catalyst contamination and deactivation, and even interferes with catalyst regeneration, and (3) relatively large quantity of sulfur as contrasted with the lighter feeds, this giving rise to objectionable emissions of sulfur dioxide and sulfur trioxide upon combustion of such fuel in industrial furnace. Ecological considerations, reflected in part by governmental demands, require elimination of sulfur from such feeds, but this can be accomplished only in the face of extreme difficulty due to the presence of the asphaltenes and ash-forming constituents. Consequently, commercial applications of such processes have been minimal. High operating costs associated with the problems of catalyst deactivation, short catalyst life and high hydrogen consumption have hindered commercial utilization of such processes.

While conventionally, catalysts for use in hydrodesulfurization processes have comprised composites which include active metallic compoents comprising metals or compounds of Group VI and/or Group VIII metals, the majority of such catalysts have not been sufficiently active to meet the requirements of a commercial process for hydrodesulfurizing petroleum residua. Recently, however, new catalysts have been developed, and described, e.g., in U.S. 3,509,044 by Clark E. Adams et al., patented Apr. 28, 1970, and these have provided a high degree of success. These catalysts often include the same metals as a part of the composite, but the preferred species are comprised of composites of a molybdenum compound admixed with compounds of nickel or cobalt deposited on a support material comprising silica stabilized alumina. The new catalysts are characterized, inter alia, as having a maximum surface area in pores of diameters ranging 30 to 80 A., with a minimum of pores with diameters ranging above 100 A. The support material, or base, comprises from about 1 to about 6 percent silica and from about 94 to about 99 percent alumina, based on the weight of the total catalyst. The improved activity of these catalysts is predicated on the theory of a "screen door" effect, i.e., a phenomenon which permits entry of relatively small molecules into the pores with simultaneous inhibition of the entry of relatively large molecules. Hence, it is predicated that there is less deactivation produced by heavy metals deposition within the catalyst pores.

A characteristic of all commercially operated hydrodesulfurization processes is that the reaction temperature must be gradually increased over the operating period, or production run, to maintain the desired percentage of sulfur removal. For example, a production run must be operated continuously for a period of at least about six months, and with conventional catalysts wherein it is desired to remove 70 to 90 percent of the sulfur from a typical petroleum residuum containing 4.0 percent sulfur, it is necessary to raise the operating temperature from about 650° F. at start-of-run to about 800° F. at end-of-run. This temperature increase requirement (TIR) is due to factors which include coke accumulation on the catalyst and possible catalyst poisoning by deposition of heavy metals within catalyst pores. It is conventional therefore to gradually increase the operating temperature of the reactor throughout a production run, and the increase is particularly manifest during the first several days, generally during the first 20 to 30 days of the operation. Even with the improved new catalysts, it is necessary to increase the temperature of the operation on the order of from about 0.5° F./day to about 10° F./day during the first ten to fifteen days to achieve a constant rate of reaction. Subsequent to this period the temperature is increased on the order of about 0.05° F./day to about 0.5° F./day.

Another drawback of present hydrodesulfurization processes, besides catalyst deactivation, is that they require large amounts of hydrogen. Not only is hydrogen necessary to effect the necessary hydrodesulfurization reaction, but it is also added as a quench to dissipate the heats of reaction. Use of hydrogen in this capacity requires a considerable increase in capital expenditures due to the required increased capacity of the equipment, particularly in view of the necessity to compress the larger amount of hydrogen for recycle. Even the addition of water to the feed to improve activity, with subsequent addition of hydrogen as a quench does not result in a process without considerable limitations inasmuch as recycle gas compression costs are very high.

It is, accordingly, among the objects of this invention:

To obviate these and other prior art process disadvantages by providing a method for suppression of the normal rate of deactivation of the catalyst, particularly as occurs during start up and during the initial 10 to 15 days of operation.

To provide a process requiring less available hydrogen present in the process to effect the desired hydrodesulfurization reactions, which results in decreased capital expenditures for a given size plant such effect being achieved without increased net hydrogen consumption.

To provide such improved process utilizing a quenching agent, which agent will also suppress deactivation of the catalyst, particularly as occurs during the initial period of the production run.

These objects and others are achieved in accordance with the present invention comprising a hydrodesulfurization process, for processing sulfur-containing petroleum residuum feeds, wherein water in injected between the several catalyst beds of a multi-bed reactor to quench the products of the reaction and simultaneously suppress the normal deactivation of the catalyst, particularly as occurs during the initial period of the production run. The water can be added to the several stages of the reactor in concentration ranging up to about 50 percent to suppress the rate of deactivation, but preferably it is added in concentration ranging up to about 20 percent, e.g. from about 2 to about 20 percent, and more preferably in concentration ranging from about 5 to about 15 percent, based on the volume of gases in the reactor. At concentrations ranging up to about 20 percent there is little decrease in reaction rate due to hydrogen dilution (which decreases hydrogen partial pressure), but above this water concentration the dilution effect of the steam off-sets the advantages grained by suppression of catalyst deactivation.

The petroleum residuum feed treated in accordance with this invention is characterized as containing relatively large amounts of sulfur, asphaltenes, metals and ash. Typically, it is a high boiling residue obtained from a distillation or other type of treating or separation process. Generally from about 30 to about 100 percent of the feed boils above 900° F., contains from about 1 to 20 percent asphaltenes, and the sulfur content ranges to about 8 percent, and generally from about 2 to about 6 percent. The metals content of the feed, mostly vanadium and nickel, can range to about 1000 p.p.m., and higher, and typically ranges from about 80 p.p.m. to about 500 p.p.m. The ash content of such feeds can range several percent, such materials generally having been added by various treating procedures employed in refinery operations. The petroleum residuum can also constitute a blend of high boiling materials such as atmospheric bottoms, vacuum bottoms, deasphalted oil, visbreaker products, heat soaked materials, gas oil cuts and the like.

A breakdown of the various components of petroleum residua, and a description of certain of its physical properties is as given below:

PROPERTIES OF PETROLEUM RESIDUA

| | Broad range | Narrow range |
|---|---|---|
| Percent boiling above 900° F | 30–100 | 50–100 |
| Gravity, °API | −5–25 | 10–20 |
| Viscosity, SFS at 122° F | 50–5,000+ | 100–1,000 |
| Sulfur, wt. percent | 1–8 | 2–9 |
| Nitrogen, wt. percent | 0–1 | 0.001–0.5 |
| Metals (p.p.m.), total | 20–1,000 | 80–500 |
| Vanadium (p.p.m.) | 10–500 | 30–300 |
| Nickel (p.p.m.) | 5–200 | 10–100 |
| Asphaltenes, wt. percent | 1–20 | 2–16 |
| Pour point, ° F | 0–200 | 25–100 |
| Conradson carbon, wt. percent | 5–20 | 8–10 |

Catalysts suitable for the practice of this invention comprise a composite of an inorganic oxide base with a metal or compound of a metal, or metals, selected from Group VIB and/or Group VIII of the Periodic Table of the Elements (Fisher Scientific Company, supra). The preferred active metallic component comprises an oxide or sulfide of nickel or cobalt, particularly the latter, and an oxide or sulfide of molybdenum or tungsten. The preferred base is alumina stabilized with silica in concentration ranging up to about 6 percent, and 94 to 99 percent alumina. Preferably also the catalyst is one having a surface area of at least 100 m.$^2$/g. (B.E.T. method), and preferably 100 m.$^2$/g. to 500 m.$^2$/g., the surface area being measured in pores having pore diameters varying from about 30 A. to about 80 A., with a minimum of the surface area or pore volume in pore diameters greater than about 100 A.

The composition of the preferred catalyst compositions, in weight percent, are summarized as follows:

| | Range of compositions | |
|---|---|---|
| | Typical | Preferred |
| Nickel or cobalt (as oxide) | 1–15 | 2–10 |
| Tungsten or molybdenum (as oxide) | 5–25 | 10–20 |
| Silica | 1–6 | 1.5–5 |
| Alumina | 93–54 | 86–65 |

In accordance with a preferred mode of practicing the present invention, a sulfur-containing petroleum residuum feed, or feed containing generally from about 2 to about 6 percent sulfur by weight, is preheated to reaction temperature and passed, with hydrogen, in concurrent flow, downwardly through a multiple fixed bed reactor. The several beds of the reactor, constituted of catalyst comprising a silica stabilized alumina (1–6 percent silica) and a metal or compounds of the metal, or metals, of both Group VI-B and/or Group VIII of the Periodic Table of the Elements, particularly those characterized as having a maximum of its surface area in pores having pore diameters of 30 to 80 A. with a minimum surface area or pore volume in pores having a diameter greater than 100 A. (as further described in U.S. 3,509,044, supra, the disclosure of which is herewith referred to and incorporated by way of reference) are separated one from the other and a water quench is fed into the spaces between the beds (reaction zones). The effluent from the reactor is fed to a high temperature-high pressure separator for further removal of hydrogen, hydrogen sulfide, and light ends. Desulfurized liquid product from the latter separator is then passed to a stripper wherein steam is injected for further separation of hydrogen sulfide and liquid product. Finished desulfurized product, after separation from the water, is removed from the bottom of the stripper.

The gaseous effluent from the high temperature-high pressure separator—viz., hydrogen, hydrogen sulfide, and light gases—is fed to a scrubber wherein the hydrogen sulfide is removed by contact with an alkaline medium, e.g.

methylethylamine. The effluent from the scrubber, chiefly hydrogen, is recycled with makeup hydrogen to the process.

Typical and preferred process conditions are as follows:

|  | Typical | Preferred |
|---|---|---|
| Pressure, p.s.i.g. (total) | 500–5,000 | 500–1,000. |
| Treat gas composition | 65–90% hydrogen | 75–85% hydrogen. |
| Space velocity (LHSV) | 0.05–10.0 | 0.1–2. |
| Temperature (EIT): |  |  |
| Start-of-run | 625–750° F | 650–710° F. |
| End-of-run | 800° F | 765° F. |
| Hydrogen rate | 500–10,000 s.c.f./b | 1,000–5,000 s.c.f./b. |

This unusual effect of the water in suppression of the normal deactivation rate of the catalyst is not understood. For example, the effect can only be observed in the treatment of petroleum residuum feeds. It does not occur in the treatment of non-petroleum residuum feeds such as light distillates, virgin gas oils, cat cycle stocks and the like. Moreover, the initial activity of the fresh catalyst is not affected. One explanation of this effect might be that the carbonaceous material which normally forms on the catalyst is oxidized and removed under the conditions of operation. This, however, does not explain why the effect is not observed with non-residuum feeds, for all feeds produce carbon deposition on the catalyst. Another explanation is that the effect may be due to the deposition of relatively large concentrations of the vanadium, or other heavy metals on the catalyst but this explanation too, appears weak in view of the general acceptance of such heavy metals as catalyst poisons. Whatever the true explanation, however, the water injection or quench is admirably suited to provide a major process improvement, and there is no significant effect on catalyst strength, hydrogen consumption or product properties.

The invention will be even better understood by reference to the following non-limiting examples and comparative data which illustrate its more salient features.

In the examples side-by-side comparative runs are made to provide a direct comparison of the activity decline between a run conducted without water addition vis-a-vis one conducted at similar conditions with water addition, as in accordance with the practice of this invention.

A catalyst is first calcined at 1000° F. for 3 hours. Portions of the catalyst are then charged to two different reactors, and each is then sulfided using a sulfur containing Safaniya vacuum gas oil. The sulfiding is carried out at a liquid hourly space velocity of 1 v./v./hr., 1500 p.s.i.g., 1500 s.c.f./b. of hydrogen and at a temperature of 635° F. At the end of seven days the sulfiding is complete, at which time the Safaniya gas oil is cut out, the reactors are raised to reaction temperature, and the petroleum residuum feed is cut in to the reactor.

EXAMPLES

A petroleum residuum feed, characterized in Table I, below, is preheated to reaction temperature, maintained at conditions sufficient to desulfurize the feed, and is concurrently fed, with hydrogen, at the same temperature, downwardly through each of the pair of reactors containing a series of fixed beds of sulfided catalyst. The process is run at a temperature of 725° F. and under a pressure of 1500 p.s.i.g. The feed rate in terms of volume of feed stock per volume of catalyst per hour is 1 and hydrogen is fed at a rate of 3000 s.c.f./b.

The beds of catalyst are separated one from another to provide spaces. Liquid water at ambient temperature is injected into the spaces between the catalyst beds of one of the reactors (Reactor A) to provide a concentration of 10 volume percent steam, based on the total gas through the reactor, but no water is added to the other reactor (Reactor B). Hydrogen is used as a quench in Reactor B, exclusively.

The petroleum residuum feed injected into each of the two reactors is characterized as follows:

TABLE I

Feed Stock Inspections

Tia Juana medium atmos. resid.

| | |
|---|---|
| Gravity, ° API | 15.0 |
| Sulfur, wt. percent | 2.19 |
| Conradson carbon, wt. percent | 11.6 |
| Modified naphtha insolubles, wt. percent | 7.5 |
| C—H analysis: | |
| Wt. percent carbon | 86.19 |
| Wt. percent hydrogen | 11.38 |
| Wt. percent nitrogen | 0.348 |
| Wt. percent oxygen | 0.30 |
| Metals, p.p.m.: | |
| Ni | 34 |
| Fe | ---- |
| V | 273 |
| Na | ---- |
| Aniline point, ° F. | ---- |
| R.I. @ 67° C. | ---- |
| Bro. No., GM/100 GM | ---- |
| Flash point, ° F. | 355 |
| Pour point, ° F. | 35 |
| Viscosity @ ° F. SSU: | |
| 100 | ---- |
| 122 | 373 |
| 130 | ---- |
| 140 | 193 |
| 210 | (1) |
| Distillation—ASTM | |
| IBP, ° F. | 505 |
| 5% @, ° F. | 622 |
| 10% @ ° F. | 694 |
| 20% @, ° F. | 772 |
| 30% @, ° F. | 840 |
| 40% @, ° F. | 905 |
| 50% @, ° F. | 978 |
| 60% @, ° F. | ---- |
| 70% @, ° F. | ---- |
| 80% @, ° F. | ---- |
| 90% @, ° F. | ---- |
| 95% @, ° F. | ---- |
| F.B.P. ° F. | 1047 |
| Percent rec. | 58.5 |
| Percent res. | 41.5 |

[1] D—1160 (1 mm.).

The catalyst employed in each of the two reactors is characterized as follows:

TABLE II

Catalyst

Composition, wt. percent

| | |
|---|---|
| CoO | 3.50 |
| MoO$_3$ | 12.50 |
| SiO$_2$ | 1.8 |

Physical properties

| | |
|---|---|
| Surface area, sq. m./g. | 315 |
| Total pore volume, ml./g. | .50 |
| Bulk density, g./ml. | .72 |
| Catalyst form—as tested | Extrudate—1/16" |
| Pore volume in pores with diameters greater than 100 A., ml./g. | 0.12 |
| Surface areas in pores with diameters between 30 A. and 80 A. | 238 |

The reactors are continuously operated over a period of about 22 days, at the conditions defined above. The effectiveness of the water in suppressing catalyst deactivation is graphically described by reference to the attached figure.

By reference to the figure it will thus be observed that the "desulfurization activity" as calculated by use of second order reaction kinetics is shown plotted vs. "days on oil" at the specified space velocity. It will be observed that initially both catalysts, as would be expected, have the same desulfurization activity; this being plotted as 100% desulfurization activity. After the desulfurization is initiated, the activity of both catalysts begins to decline. The rate of activity decline of the catalyst in Reactor A, however, is slower than the catalyst of Reactor B. After about five days the rate of decline of the catalysts in both Reactor A and Reactor B is about the same, and the rate of decline continues to be about the same out to the end of the twenty-second day, at which time the runs are voluntarily terminated. These results, however, clearly show a continuing advantage for water addition inasmuch as the water injection between the stages suppresses catalyst deactivation.

Calculations show that the use of water in lieu of hydrogen as a quench result in significant saving due to recycle gas compression costs.

It is apparent that various modifications are possible without departing from the spirit and scope of the present invention, as will be apparent to those skilled in the art.

Having described the invention, what is claimed is:

1. In a process wherein a sulfur-containing petroleum residuum feed is contacted, in the presence of hydrogen, with a catalyst comprised of a compound of cobalt or nickel in admixture with a compound of molybdenum or tungsten, a support having from about 1 to about 6 percent silica and 94 to 99 percent alumina, and wherein the catalyst has a surface area of at least 100 m.$^2$ g. in pores having pore diameters in the 30 A. to 80 A. range at sufficient temperature and pressure to effect a hydrodesulfurization reaction and the catalyst is staged in multiple-beds separated one from another to provide spaces between reaction zones in the reactor, the improvement which comprises injecting water into the spaces between said reaction zones in concentration ranging from about 2 to about 20 percent, based on the total volume of gases in said reactor.

2. The process of claim 1 wherein said catalyst comprises a compound of cobalt and a compound of molybdenum.

3. The process of claim 1 wherein the catalyst is further characterized as having from about 100 m.$^2$/g. to about 500 m.$^2$/g. surface area measured in pores of pore diameters in the 30 to 80 A. range, with a minimum pore volume measured in pore diameters above the 100 A. range.

4. The process of claim 1 wherein the water is injected during at least the first 10 to 15 days of a production run.

References Cited
UNITED STATES PATENTS

| | | | |
|---|---|---|---|
| 3,501,396 | 3/1970 | Gatsis | 208—216 |
| 3,116,234 | 12/1963 | Douwes et al. | 208—216 |
| 3,112,257 | 11/1963 | Douwes et al. | 208—216 |
| 3,542,672 | 11/1970 | Lhonoré et al. | 208—217 |
| 3,509,044 | 4/1970 | Adams et al. | 208—216 |
| 3,531,398 | 9/1970 | Adams et al. | 208—216 |
| 3,471,398 | 10/1969 | Borst, Jr. | 208—209 |

DELBERT E. GANTZ, Primary Examiner

G. J. CRASANAKIS, Assistant Examiner